(12) United States Patent
Schellstede

(10) Patent No.: US 9,347,433 B2
(45) Date of Patent: May 24, 2016

(54) WIND TURBINE INSTALLATION AND ADVANCE DOUBLE COUNTER-ROTATING BLADES, 90° DRIVE ASSEMBLY WITH LOWER GENERATOR MOUNTING SYSTEM

(71) Applicant: Herman Joseph Schellstede, New Iberia, LA (US)

(72) Inventor: Herman Joseph Schellstede, New Iberia, LA (US)

( * ) Notice: Subject to any disclaimer, the term of this patent is extended or adjusted under 35 U.S.C. 154(b) by 183 days.

(21) Appl. No.: 13/734,495

(22) Filed: Jan. 4, 2013

(65) Prior Publication Data

US 2014/0015255 A1  Jan. 16, 2014

Related U.S. Application Data

(60) Provisional application No. 61/631,529, filed on Jan. 5, 2012.

(51) Int. Cl.
| | |
|---|---|
| *F02D 11/04* | (2006.01) |
| *F03D 9/00* | (2016.01) |
| *F03D 1/02* | (2006.01) |
| *E02B 17/00* | (2006.01) |
| *F03D 1/00* | (2006.01) |
| *E02D 27/42* | (2006.01) |
| *F03D 11/04* | (2006.01) |
| *E02B 17/02* | (2006.01) |

(52) U.S. Cl.
CPC ............... F03D 9/002 (2013.01); F03D 1/025 (2013.01); F03D 11/04 (2013.01); *E02B 17/027* (2013.01); *E02B 2017/0091* (2013.01); *E02D 27/42* (2013.01); *F03D 1/001* (2013.01); *F03D 11/045* (2013.01); *F05B 2240/9121* (2013.01); *F05B 2240/95* (2013.01); *Y02E 10/725* (2013.01); *Y02E 10/727* (2013.01); *Y02E 10/728* (2013.01); *Y02P 80/22* (2015.11)

(58) Field of Classification Search
CPC .......... E02B 17/027; E02B 2017/0091; E02D 27/42; F03D 1/001; F03D 1/025; F03D 11/04; F03D 11/045; F05B 2240/95; Y02E 10/727
USPC ....................................... 290/44, 55
See application file for complete search history.

(56) References Cited

U.S. PATENT DOCUMENTS

| | | | | |
|---|---|---|---|---|
| 4,421,967 | A * | 12/1983 | Birgel et al. | 219/631 |
| 4,832,571 | A * | 5/1989 | Carrol | 416/132 B |
| 5,506,453 | A * | 4/1996 | McCombs | 290/44 |
| 6,476,513 | B1 * | 11/2002 | Gueorguiev | 290/55 |
| 6,492,743 | B1 * | 12/2002 | Appa | 290/55 |
| 7,198,453 | B2 * | 4/2007 | Hall | 415/4.3 |
| 8,511,940 | B2 * | 8/2013 | Hall | 405/195.1 |
| 8,742,612 | B1 * | 6/2014 | Robbins et al. | 290/55 |
| 2009/0322085 | A1 * | 12/2009 | Renaud | 290/44 |
| 2012/0161443 | A1 * | 6/2012 | Moser et al. | 290/44 |
| 2014/0217238 | A1 * | 8/2014 | Jakubowski et al. | 244/114 R |

\* cited by examiner

*Primary Examiner* — Tho D Ta

(57) ABSTRACT

A Wind Power system employing a three-tube tower, double, counter-rotating blades and a means to carry the wind energy power to a remotely located generator. The system employs a method to transmit the power from a horizontal vector to a vertical vector by means of a 90° magnetic translating method which delivers the power with no power loss.

The system, by the physical placement of the generator, transformer, switches and controls, provide a great reduction in tower support weight and further provides for a cost efficient system. To further the overall efficiency of the system, special designs of the leading edge of the blades are fitted with tubercles which allow the blades to be pitched at greater angles, thereby increasing the power which can be gathered. This system, due to the teachings of this invention, can be constructed, installed and maintained at a substantially lower cost than that of a wind system currently being employed in the industry.

15 Claims, 25 Drawing Sheets

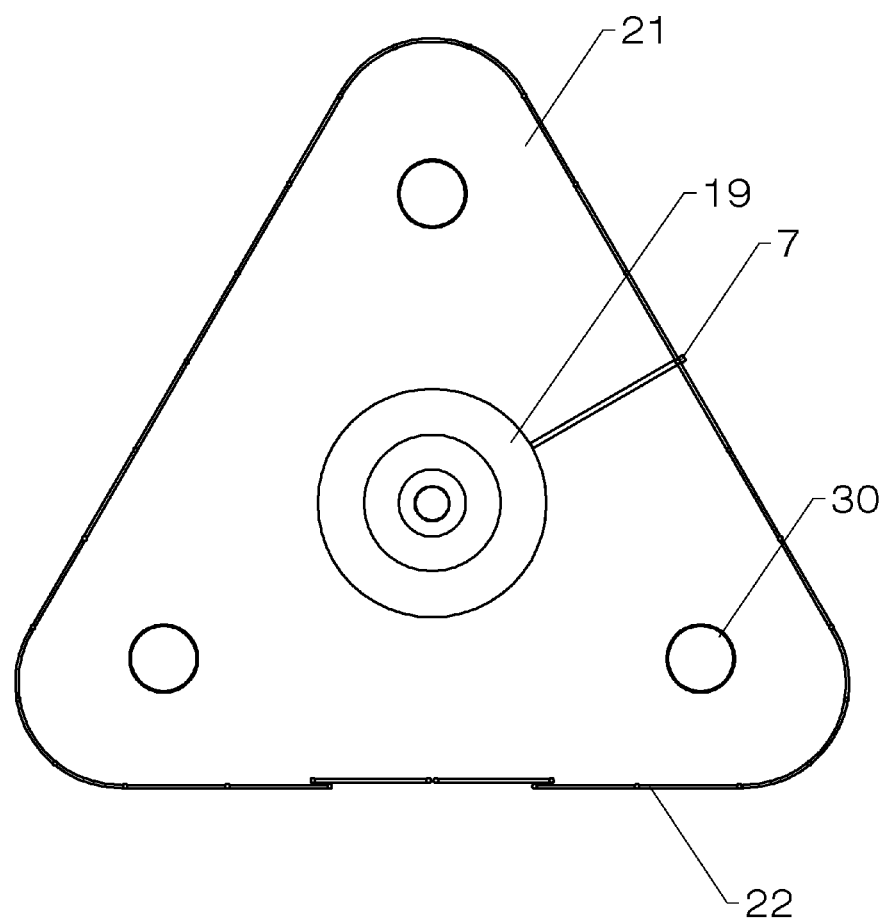
FIG. 5-A

| Cost Comparison | | | |
|---|---|---|---|
| Platform Type | Project Name | Installed 1 MW Million USD | Installed 3 MW Unit Million USD |
| 4 Pile | North Sea Units | 8.1 | 24.3 |
| Mono Pile | Cape Wind | 7.3 | 21.9 |
| Mono Pile | Block Island | 7.4 | 22.2 |
| Mono Pile | Blue Water | 7 | 21.0 |
| Mono Pile | Deep Water | 17.4 | 22.2 |
| 3 - Caisson | Schellstede Invention | 5 | 15 |

FIG. 20

WIND TURBINE INSTALLATION AND ADVANCE DOUBLE COUNTER-ROTATING BLADES, 90° DRIVE ASSEMBLY WITH LOWER GENERATOR MOUNTING SYSTEM

CROSS REFERENCE TO RELATED APPLICATIONS

The application is a non-provisional, and claims priority benefit, of U.S. Patent Application Ser. No. 61/631,529 filed Jan. 5, 2012, which is incorporated herein by specific reference.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO APPENDIX

Not applicable.

BACKGROUND OF THE INVENTION

1. Field of the Invention

The invention disclosed and taught herein relates to wind driven power generation systems and more specifically relates to wind turbine efficiency and maintenance for use in onshore or offshore locations.

2. Description of the Related Art

U.S. Patent Application Publication No. 61/631,529 discloses a wind system, which incorporates double, counter-rotating blades, driving a singular vertical shaft. The power is converted from horizontal to vertical by use of a magnetic translation device. The power is transmitted to near the earth or ocean surface elevation whereby a generator is mounted thereby allowing the vertical shaft to rotate the generator in turn producing electrical power.

The invention disclosed and taught herein is directed towards a major improvement of wind systems to be used onshore or offshore.

BRIEF SUMMARY OF THE INVENTION

A wind translating system, which can be employed in onshore or offshore locations. The system places the electrical generator near the ground or ocean surface. The drive system from the blades to the generator has very efficient means to reduce power losses and lower the cost of power.

Due to the weight reduction of the tower top, the design of the tower can provide a lighter and lower cost system. The double, counter-rotating blades are designed to accept upwind and downwind winds. The leading edges are equipped with tubercles, which further improve the efficiency of the blades. Due to the lightweight translating system, the self-erecting system is employed to remove the need for heavy lift expensive equipment both onshore and offshore applications. The means, which are employed to change the direction of the power flow, is important. No power losses are encountered in the use of the magnetic translating design. No friction or heat is exhibited, nor are any requirements for lubrication necessary.

The system accepts, shock loading and slippage if the weather conditions are harsh. The complete system can be mounted onto an onshore foundation or an offshore platform. The invention will produce 20% to 25% more power than conventional wind systems. The invention can produced power for 30% less cost than the conventional systems.

The blades can be configured for storm conditions, which provide the minimum footprint subject to storm winds. To access the turbine/system in harsh weather, the double blades can be placed in a horizontal mode allowing access to a heliport, which is located between the blades. The offshore platform can also be boarded via helicopter or a special boarding vessel.

Piles are pre-driven to the mud line elevation. The piles are driven to the same dimension, which exists in the liftboat leg layout. Hence, the liftboat is supported via the pre-driven piles thereby removing the pre-loading requirement.

The invention has considered the basic requirements to provide an offshore wind system, which can be constructed in an efficient manner, the system is cost efficient and can be maintained at a minimal cost. The system has the advantages of producing an excellent power capacity profile in moderate wind velocities.

BRIEF DESCRIPTION OF SEVERAL VIEWS OF THE DRAWINGS

FIG. 5-A illustrates a plan view of the onshore base layout.

FIG. 7-A illustrates the ball grab attachment device.

FIG. 9A illustrates the connection end of the vertical power transmission shaft

FIG. 20 illustrates a chart showing the economic advantages of the invention compared to industry standard units

DETAILED DESCRIPTION OF THE INVENTION

Figure 1:
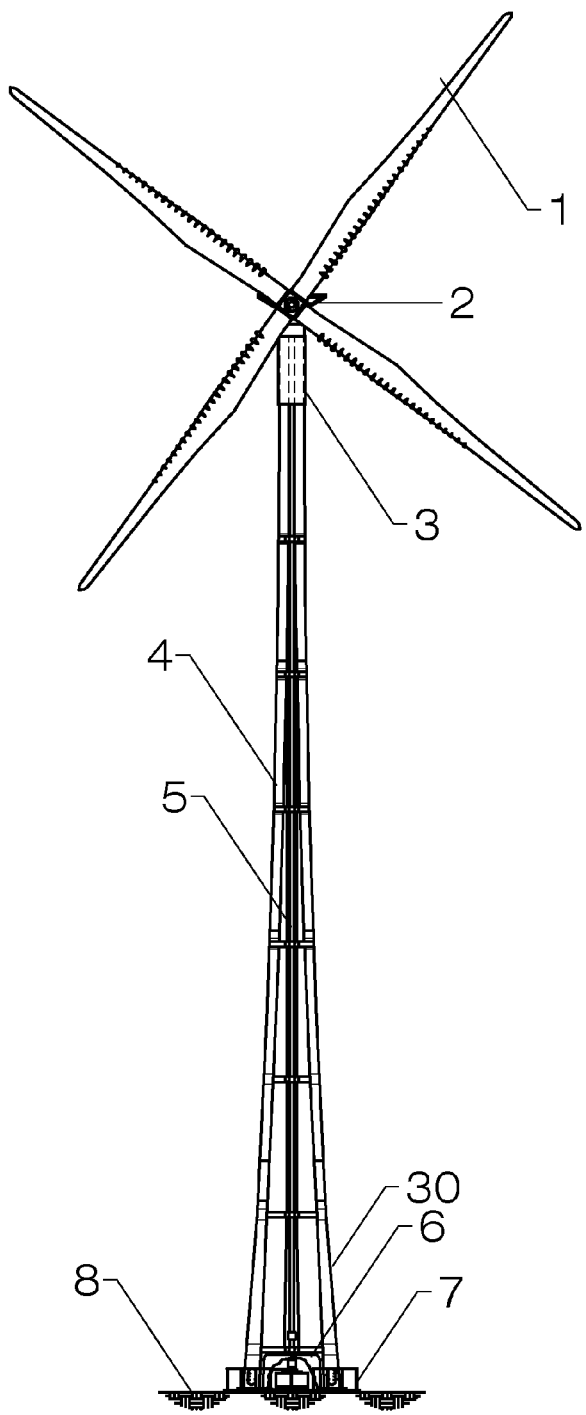
FIG. 1 illustrates the invention in a profile view. The illustration considers the system mounted in an onshore location.

The invention has been developed to allow wind power to be economic in moderate winds in onshore and offshore locations. The invention further teaches the means of equipment installation and efficient maintenance in onshore and offshore locations. A major advancement of the invention is the magnetic translating speed adjustment system. Shock loading and peak load impulses are removed from the power train. Harmful vibrations are all removed by use of the vibration dampener unit.

The invention has addressed and solved many problems, which have caused wind power systems to be expensive to build and maintain. By use of this invention, the construction of wind farms in moderate winds throughout the world will be supported.

Battered caissons are installed via an underwater template, which guides the tubes during the installation process. Once the caissons are driven, the template is removed for further use. Tapered wall thickness of the caisson is employed where the strength of the tube can be modified depending on the loading conditions. The bending moments are greatest at the mud line. High corrosion also exists at the surface splash area. Hence, heavy wall thickness is employed allowing the caisson outside diameter to remain constant.

The tri-pod caisson platform provides the minimum structural weight of the platform and provides for a minimum footprint with regards to currents, waves and ice conditions.

The three-pod caisson also provides a method to secure the platform from access of unauthorized persons. The cost of construction of the caissons is at a minimum due to constant outside diameters. In offshore wind farms, the power must be gathered from each platform via a cable. A J-tube is required at each platform to accept the cable. The caisson design allows the J-tubes to be internal of the caisson and protected. A method to set the depth of the J-tube exit is also part of the invention. Coatings are applied to the caissons both internal and external. Anodes are also affixed to the caisson as per design requirements.

The caissons are fitted with a transition section. The section embodies the three caisson structures into one structural body. The transition section has many novel components, which are prepared onshore. Prevention of costly offshore assembly must be avoided. The attachment of the caisson to the transition section is conducted through a narrow gap welding method employing a special sub-arc welding system. The transition section is pre-fitted with a machined narrow gap-welding groove. The installation of the caisson requires that the top extremity of the caisson be re-cut at 90° to the axis of the tube. After the driving process is complete, the pre-set narrow gap groove is fitted onto the caissons. A stabbing guide will assist in the installation.

The installation vessel is equipped with work platforms to accommodate the automatic welding system. Hence, all the caissons are welded in one event thereby reducing the cost of offshore installation. The transition section is best described as the center of operation of the wind unit. The structure has three downward-placed extension tubes to connect to the caisson. The upper section is outfitted to accept the tower. The transition section is lifted and set in one event. The equipment, generator, transformer, switches, ventilation system and wiring assembly task are conducted onshore. The complete transition section power unit is complete and ready for operation once connected to the other components.

The wind industry employs a tapered tubular tower for the support of the wind turbine equipment. The standard towers are tapered and of different wall thickness. The standard towers are bolted together by flanges at different levels. Wall thickness in some cases can be as thick as 4" and 18'-0" in diameter. The tower loads can be 250 ton and 500 tons of equipment located at the top of the tower.

Due to the placement of the generator's system, at the base of the tower, a lighter less costly tower can be provided by the teachings of this invention. The use of manufactured tubes is of great importance. The tubes which are manufactured in bulk do not require the cost of rolling and welding 10' sections together as per standard wind towers, rather the manufactured tubes can be purchased in 80' lengths and sizes up to 42" having different wall thickness. The time of construction and cost can be greatly reduced by the use of manufactured tubes.

The efficiency of the power train is of great importance based on produced power from a given source. The devices, which are considered the prime movers of the power system, are the blades. The invention teaches that double, counter-rotating blades can be 18% to 20% more efficient than standard three blade units. The blades have been proven to be much more efficient in helicopters, aircraft and pumping systems. Hence, the invention employs the double, counter-rotating blade design. The blades have a specific angle of attack, which defines the level of efficiency. The stall angle of the blade can be increased by use of tubercles located on the leading edge of the blades. Tests have proven that the blades of this invention can produce 8% to 10% more power than conventional blades. Blades which turn in opposite directions also result in less torsional load directed onto the support tower. The counter-rotating blades also have a lesser sound level than conventional blades.

The invention teaches that the majority of equipment is located at the base of the tower; hence only minimum access is required at the top of the tower. The three-tube tower provides three conduits to service the upper tower. Elevators in two of the three tubes are employed for personnel transfer. The third tube provides an emergency escape system and a conduit for control wiring and ladders. The manufactured tubes are pre-coated with a thin film coating to protect the tower resulting in a 25-year useful coating life. The offshore tower assembly, due to its light weight, can be lifted in one event. The complete system is lifted via a wishbone boom crane unit having twin booms.

The tower and wind translation system are installed in one event. The base of the tower is equipped with ball grabs, which will attach the tower to the transition section. The requirement for welding is not necessary at the ball grab section. The ball grab is an automatic mechanical system. The ball grab unit can be disengaged for removal of the tower employing special tools.

The blade control is also simpler than three blade conventional systems. One control unit provides pitch control of both inline blades. Blades are designed for upwind and downwind services. The invention has both upwind and downwind blades in the system. The upwind blades are the lead blades and are located at a greater distance from the nacelle than the downwind blades. The power, once gathered by the upwind and downwind blades, is introduced into a 90° translating unit. The blades drive a horizontal shaft. The power must be redirected 90° to allow the power to be transmitted vertically downwind to the generator.

The wind industry has tested the 90° translating system using mechanical gears; however the power losses are too great to be efficient; hence, the industry has not approached the gear driven 90° systems. The invention requires a 90° translating system, which has no power loss and no lubrication requirements. The arrangement of the double, counter-rotating blades also require a slippage clutch to allow for shock loading and blade adjustments. The invention teaches the use of a permanent magnetic system, which redirects the power from horizontal to vertical. The system has no power loss, no heating, requires no lubrication and can "slip" without heat buildup or mechanical damage. The 90° translating system is designed with three radial bearings and one thrust bearing. The shaft support bearings require lubrication.

By employing the magnetic 90° translating system, a large reduction of equipment weight is realized. Industry standard wind turbines, having a capacity of 3 MW, have an equipment weight between 250 and 300 tons. The equipment weight of the translating unit illustrating in this invention is 60 tons. The weight reduction allows the tower to be of lighter construction and the hub height is increased to a level of greater wind velocities. The system requires no maintenance and will provide a "slip" system to reduce shock loading of the power train. The power train has a shaft 90° from the horizontal shaft and extends from the top of the tower to the base of the tower. The lower end of the shaft is equipped with a spline and coupling unit. The coupling joins the shaft to the generator.

The power shaft is constructed of carbon fiber material and has steel threaded connections for each section. The segments of torque tubes are joined and specific areas accommodate a bearing surface to maintain the alignment of the power shaft. The bushings are considered the lateral restraint. The spacing of the lateral supports is determined by the tower height. The bushings are a self-lubricating system whereby no maintenance is required. The power shaft is connected to the generator via a magnetic speed adjustment system which provides a constant speed to drive the generator.

The installation of a wind farm employing offshore equipment is very efficient and provides the minimum of installation cost. The capital cost of the wind system and installation employing the teachings of this invention has a remarkable cost reduction compared to standard wind farms being used. The boarding of the vessel for maintenance in harsh weather is also taught by the details of this invention.

Due to the unique design of the wind tower, landing of a helicopter is safe and efficient. By placing the double, counter-rotating blades in a horizontal position, the heliport is exposed providing a landing pod. The second method to board the platform is via a maintenance liftboat. In moderate wind conditions, boarding of the platform is possible for more than 95% of the time. Harsh weather conditions may exist causing normal boarding operations not to be possible. As stated above, two approaches are possible, i.e. aircraft and a special marine boarding vessel.

There are many conditions, which would allow boarding via helicopter and not by ocean transportation. For example, after the passage of a major storm or hurricane, the ocean conditions are too harsh for boarding from a vessel, hence the flying conditions are excellent and boarding of the platform is possible.

Another example is major fog conditions. Having fog may eliminate the use of a helicopter however; the marine boarding vessel can be employed. The boarding of a platform in harsh conditions by use of the invention will allow boarding to over 95% of the production time.

The production of electrical power must be conducted 24-hours per day; hence maintenance programs are required on a scheduled basis to maintain production. In reference to emergency shutdown of the power system, the invention teaches replacement rather than repair. It has been found, in offshore oil and gas operations, that replacement of components are much more efficient than offshore repair efforts.

The invention in all cases teaches that the maintenance boarding vessel can replaces major components in minimum time and that the damaged component is taken onshore for repair and then placed in inventory. Studies have showed that in typical offshore wind farms that a prevailing wind is evident. Having knowledge of the wind direction, a boarding plan can be prepared. Historical records record that prevailing winds can be between 65% and 75% of the time from one direction. Therefore, in orientation of the platform, care is taken to identify the lee side of the platform for boarding purposes. The invention teaches the use of a special marine boarding vessel, which is constructed to accommodate the offshore platform/turbine maintenance requirements only.

Liftboats have been employed for years in the oil and gas industry to provide a stable work platform. The liftboat elevates a barge out of the sea action. The legs are embedded into the ocean bottom. Hence a stable platform is provided. One problem with liftboats is the requirement that once the barge is elevated out of the sea action that a 12-hour pre-loading procedure must be performed. The pre-loading procedure protects the liftboat from failure due to the ocean bottom conditions. The pre-loading procedure cannot be used in manual maintenance and repair procedures due to excessive cost. This procedure eliminates the need for pre-loading. The special liftboat design is described under a separate provisional patent application U.S. No. 61/687,770.

FIG. 1 is an illustration of the invention, which is shown in a land (onshore) location. Item 1 illustrates the double, counter-rotating blade system. Item 2 illustrates the 90° Translating System. The dampener 3 supports the 90° Translating unit 1. The dampener 3 is connected to the three-tube tower 4. The three-tube extends downward, near the base surface 8. The tapered tubes 30 are a transition from the standard tube o.d. and increases in o.d. to the base foundation. The tower analysis provides a method to adjust the diameter and wall thickness to accommodate the maximum loading conditions.

Embedded within the three-tube tower is a drive shaft 5, which extends from the 90° Translating unit to the generator house 6. The complete assembly allows the support of a minimum tower top weight and the proper placement of the generator, transformer and controls at a low elevation. The unit can be assembled employing minimum surface lifting equipment.

Figure 2:
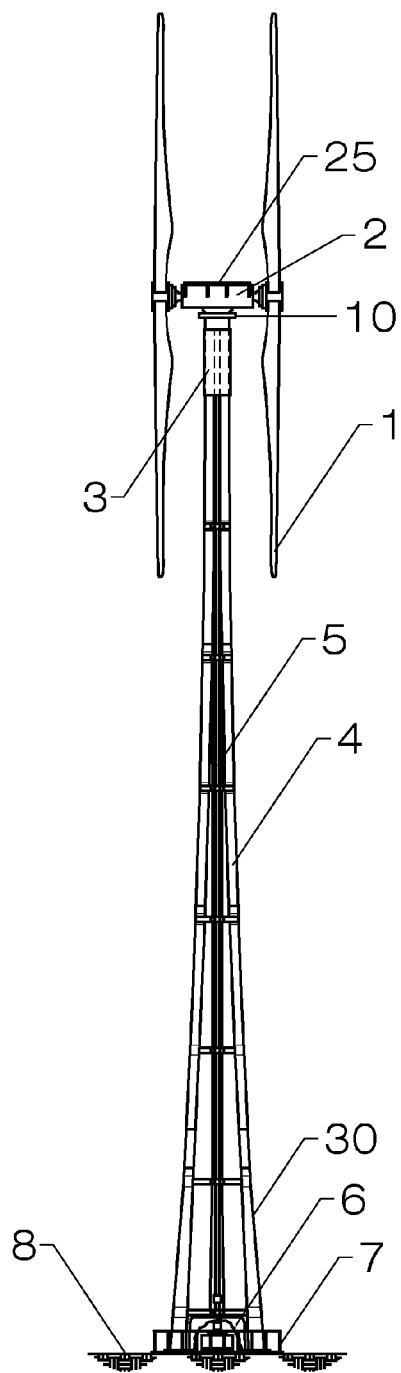
FIG. 2 illustrates the invention in a frontal view illustrating the unit mounted onto an onshore location.

FIG. 2 illustrates the invention shown in a frontal view. The invention illustrates the produced power outlet location 7. The illustration also shows the heliport 25 and the 90° Translating System 2 to which is mounted to the dampener 3. The blade 1 can be placed in an operational mode, i.e. storm and maintenance mode. The blades can be placed in a horizontal mode to expose the heliport for aircraft use.

Figure 3:
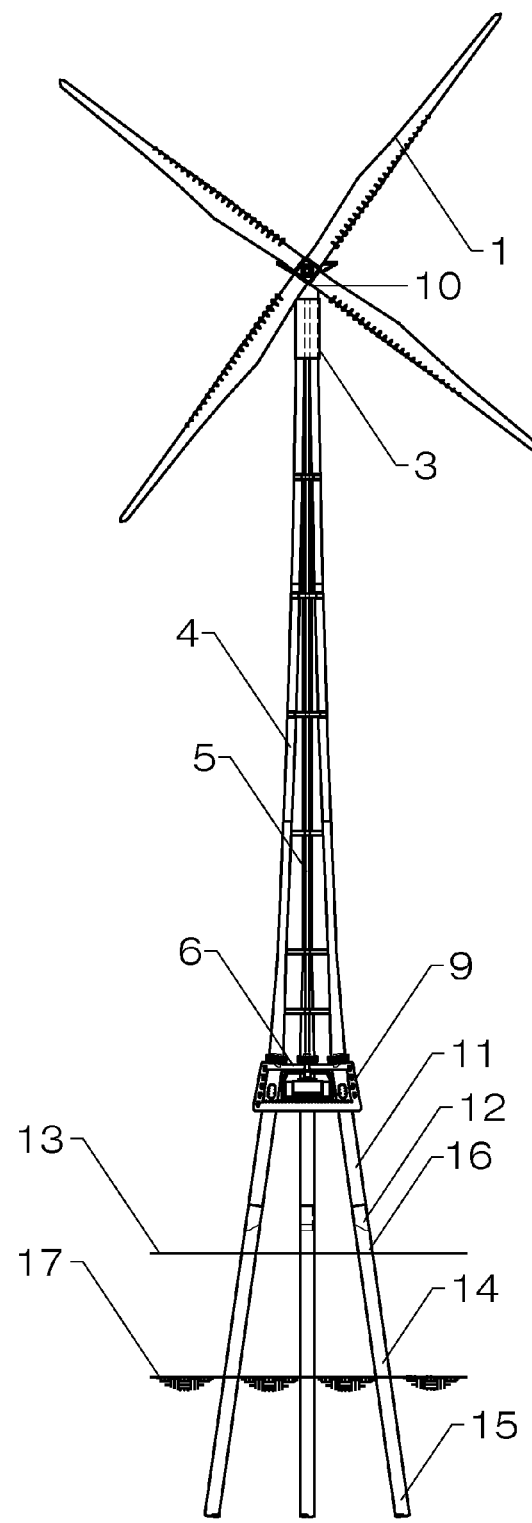
FIG. 3 illustrates the invention in a profile view. The illustration shows the invention in an offshore location.

FIG. 3 is the invention mounted aboard an ocean bottom-fixed platform. The ocean surface 13 and ocean bottom 17 defines the water depth. Water depths ranging from 10' to 400' are depths that can be accommodated employing a bottom-attached structure. The platform has a transition unit 9, which joins the three-tube tower 4 to the caisson type platform. The caisson 14 is driven to a designated depth employing standard equipment. The caissons extend through the water depth as shown in 14. The splash zone 16 is protected from rapid corrosion by special coatings and increased wall thickness. The caissons 14 are jointed to the transition section 9 at the joint area 12. Tubular extensions 11 are fitted to the transition unit.

The electrical generator, controls and transformer are elevated 60'-0" above the sea level 13. During storms, the tides and wave action can be accelerated to a height of 40' to 50'. The equipment height has been established by empirical data received from years of offshore service.

Figure 4:
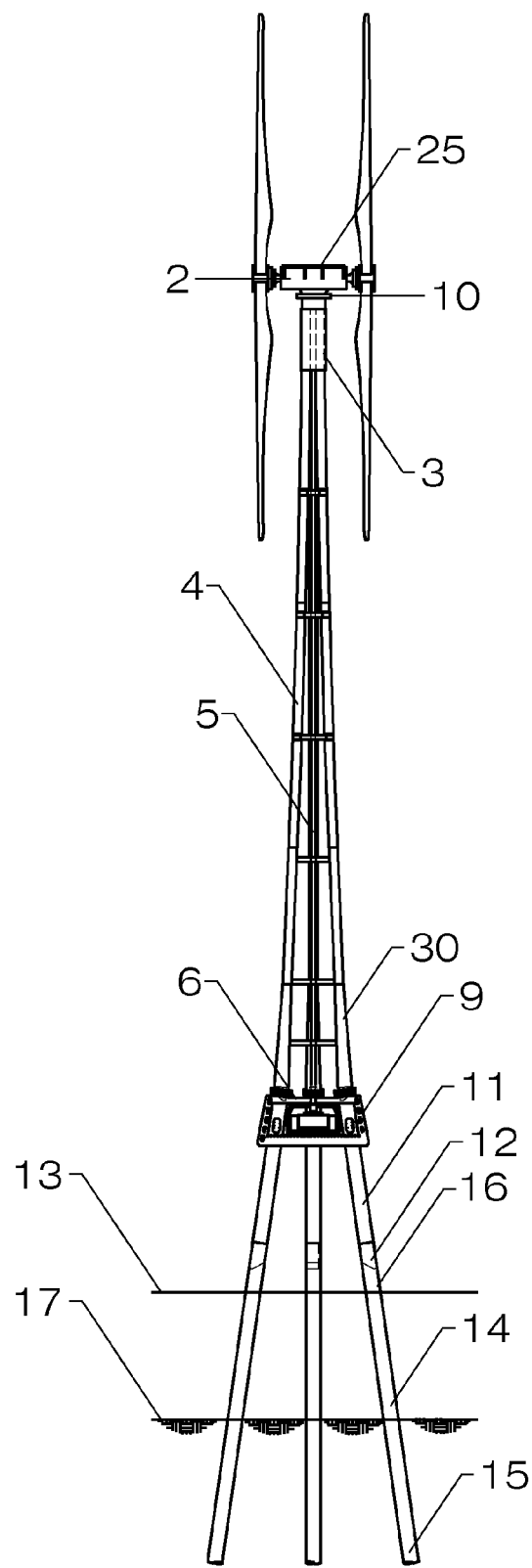
FIG. 4 illustrates the invention in a frontal view. The illustration shows the invention in an offshore location.

FIG. 4 illustrates the invention in a frontal view. The connection 10 joins the translating unit 2 to the leveling and dampener unit 3. Hence, it can be understood that the invention can be mounted onto a land-based foundation or an offshore, bottom-fixed platform. The invention can also be mounted to a liftboat, semi-submersible unit, ship, spar or other marine structures.

Figure 5:
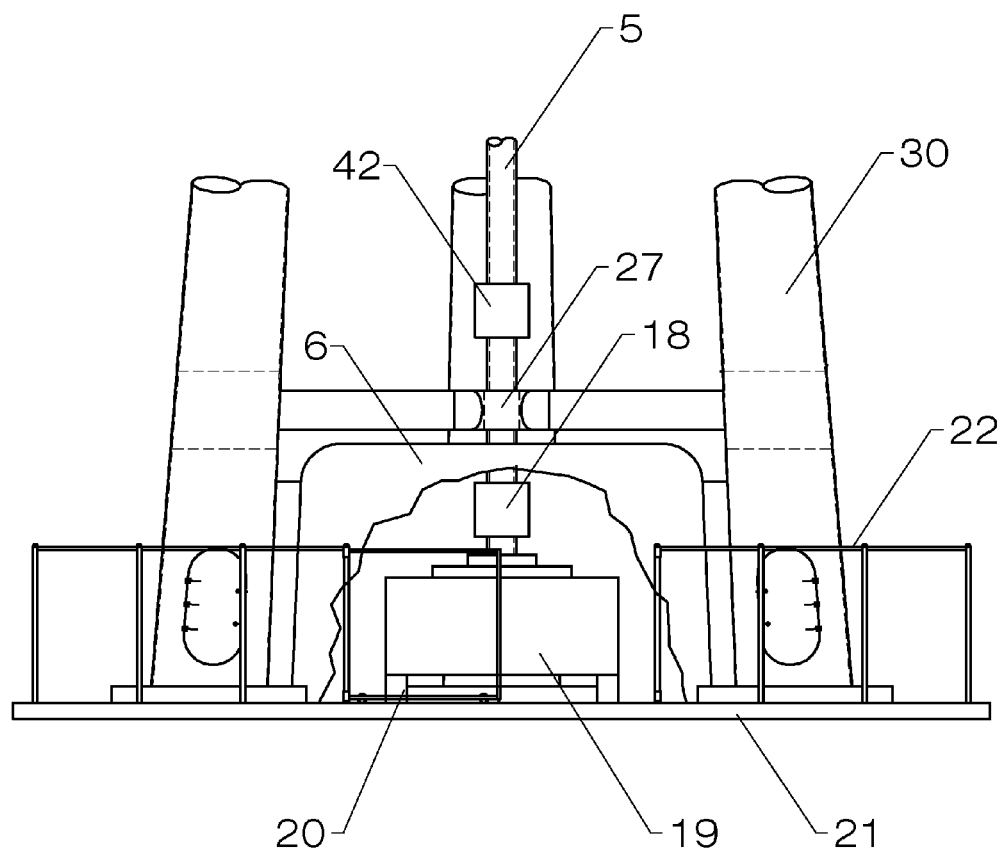
FIG. 5 illustrates the mounting arrangement of the generator and support equipment in an onshore operating mode.

FIG. 5 illustrates a profile view of the power-generating unit. The tapered tower legs 30 extend downward to the top of the land-based foundation. Doors are provided for entrance into the three tower legs. An elevator is mounted inside of each tower unit. The tower support tubes 30 are attached to the foundation 21. The generator 19 is mounted onto skid type platens, which are leveled onto the foundation 21. A magnetic speed adjustment coupling 18 joins the vertical power shaft 5 to the generator 19.

The magnetic speed adjustment coupling 18 is equipped with a magnetic system and spline connector to allow for expansion of the vertical power tube 5. This illustration of the power unit explains the major components of the system. The generator is protected via security fence and gate. The generator and components can be repaired or replaced without the requirement of access to the tower top. The maintenance or replacement can be conducted at minimum cost. In the event of major problems, the generator 19 or major component can be replaced without delay or extra expense.

FIG. 5A illustrates a modified plan view illustration showing the tower tube tapered tower 30, the center located generator 19, the foundation 21 and the security fence 22. The arrangement provides adequate areas for equipment placement and direct access to the power equipment. Produced power is transferred via the power cable 7 located on the foundation 21.

Figure 6:
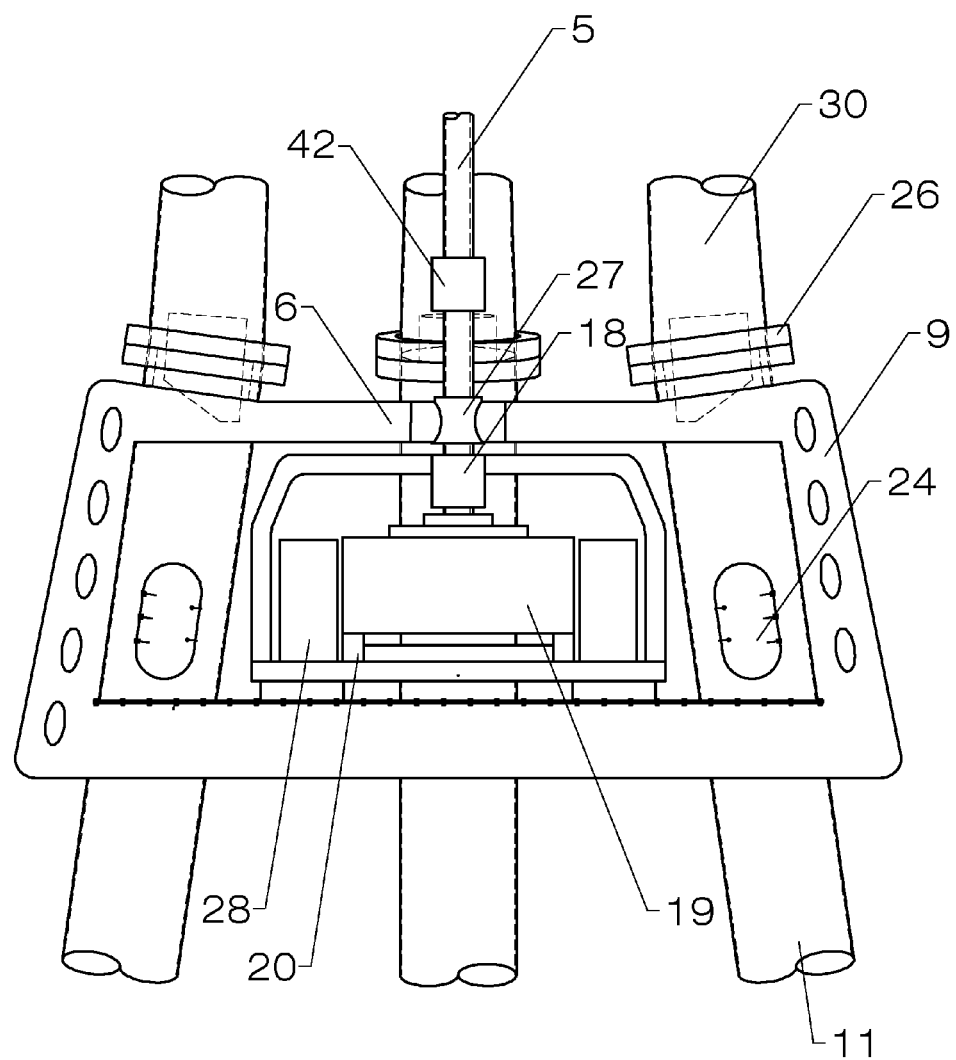
FIG. 6 illustrates the mounting arrangement of the generator and support equipment in an offshore operating mode.

FIG. 6 illustrates the profile view of the power unit, which is employed in offshore operations. The transition section 9 provides a mounting area for the various components and other structural members. The generator 19 has support transformer and controls, which are mounted onto the skid rail base 20. The tubular member 11 extends from the transition unit downward to be joined to the caissons 14. The tapered tubular tower tubes 30 are joined to the transition section 9 via a ball grab unit 26. The tapered tower legs are equipped with access doors 24. The upper section of the transition section 9 is fitted with a watertight bushing 27 which seals the inside of the generator house. The transformer control 28 is illustrated mounted to the generator package 19.

Figure 7:
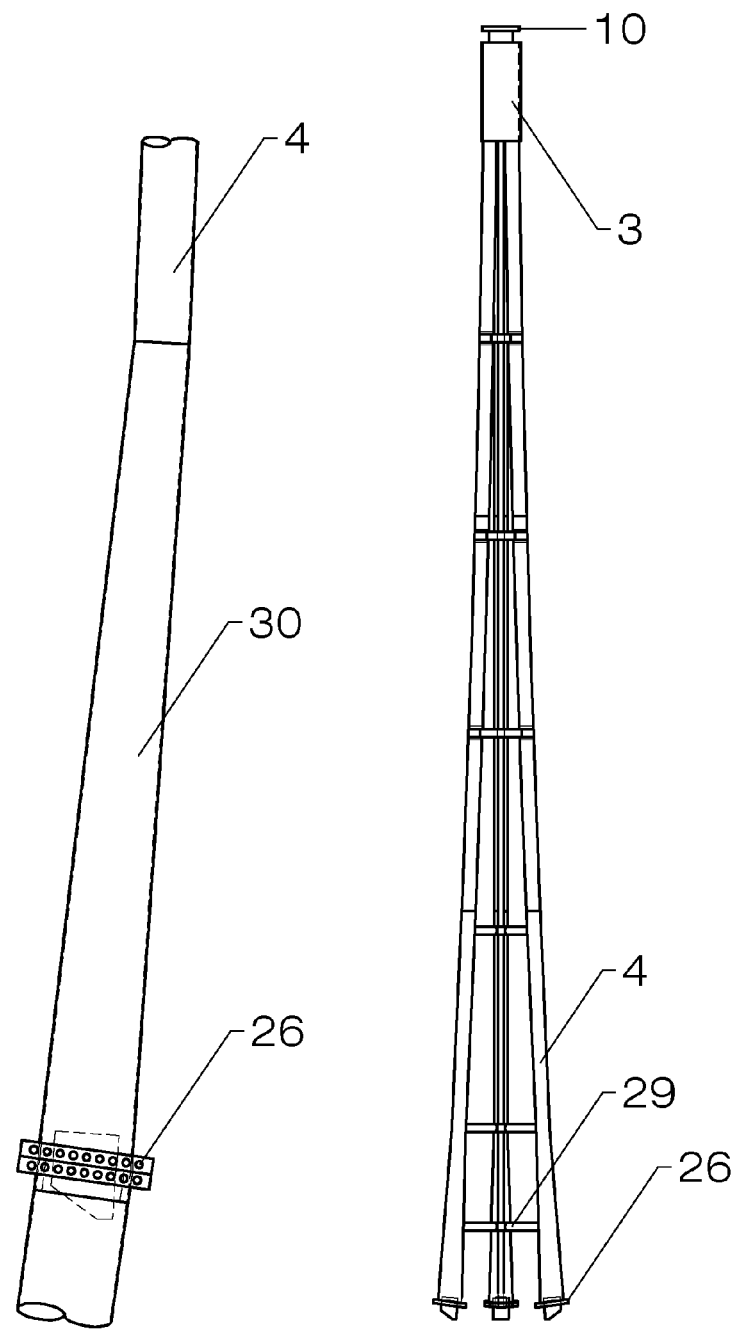
FIG. 7 illustrates the three-tube tower arrangement illustrating the structure and lateral supports.

FIG. 7 illustrates the three-tube tower unit 4. The ball grab units 26 are illustrated at the lowered end of the tubular tower legs 4. The three tubes are joined at the top section dampener 3. The tubes are laterally supported via a horizontal structure 29. The lower section of the ball grab 26 is fitted with a tapered stabbing guide.

FIG. 7A illustrates the tower jointed to the transition section 30 via the ball grab 26 units. Ball grabs 26 are manufactured employing steel spherical balls arranged in two levels of grooves. The grooves allow the balls to retract when the male section enters the assembly. Once the male/female section is jointed, the balls are set, thereby locking the structure. The ball grab 26 cannot be separated unless special release tools are employed. Hence, very rapid assembly of the tower to the transition section is provided, thereby eliminating costly offshore assembly costs.

Figure 8:
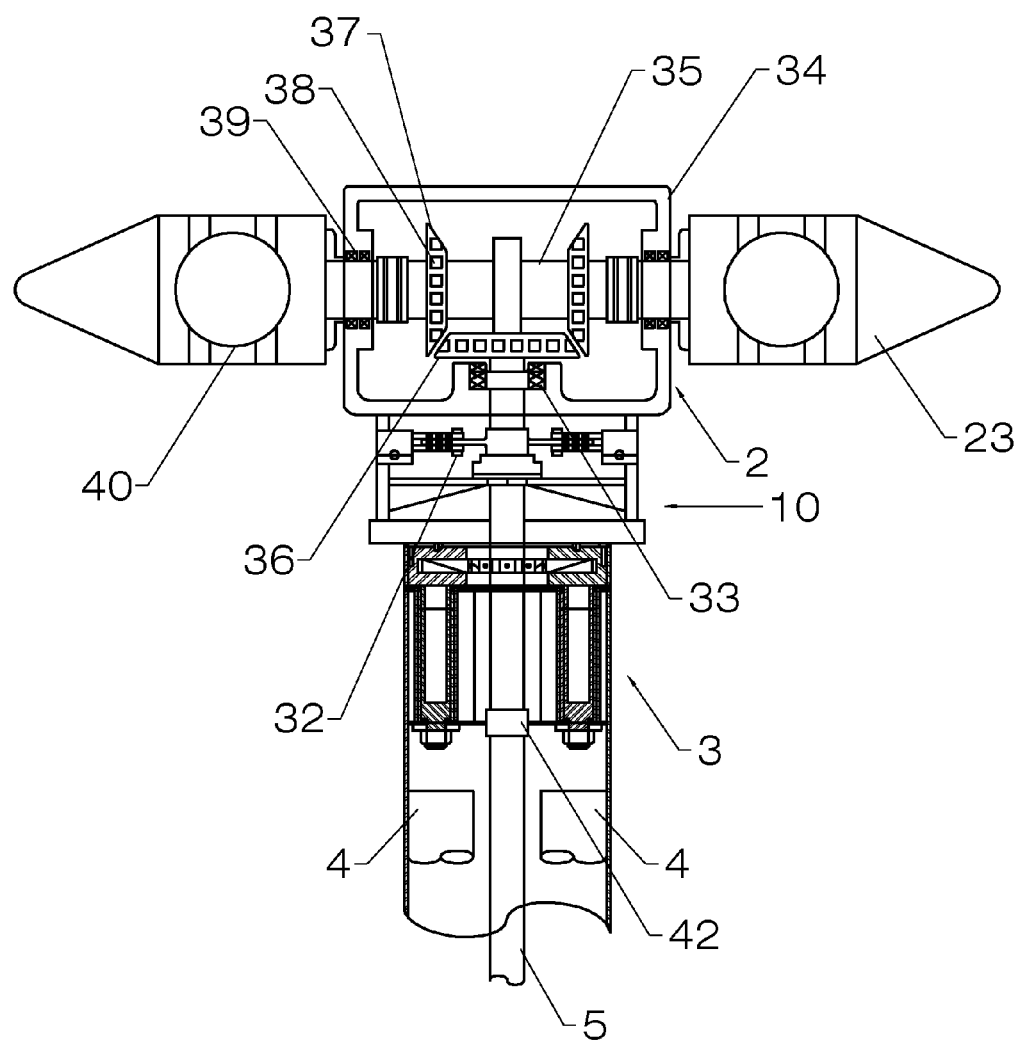
FIG. 8 illustrates the 90° Translating System that is located at the tower top and vibration dampener.

FIG. 8 illustrates a sectional view of the blade mounting hub 40, the nacelle cone unit 23 and the 90° Translating System 2. The 90° Translating unit 2 has a structural case 34. The case provides an enclosure for bearings 39 and the horizontal master shaft 35.

The 90° Translating unit 2 is invented to provide power, which is introduced by unit blades 1. The power is introduced in a horizontal mode. The power from the horizontal shaft 35 is translated to a vertical mode by a magnetic action of the magnetic cones 37 to the opposing magnetic cone 36. The cones are fitted with special permanent rare earth magnets 38. The arrangement is placed to provide an opposing eddy current arrangement to exist which causes rotation of the opposing component cone 36. Hence, power is transmitted via the translating system.

By use of double, counter-rotating blades 1, power can be introduced into opposite ends of the 90° Translating unit 2. The magnets are of sufficient size and shape to transmit the torsional moment, which is produced by the rotating wind blades 1. The magnetic cones 36 & 37 will transmit the force without physical contact. The assembly requires no lubrication and no heat is developed.

The high power loss due to contacting mating gears is eliminated, therefore providing high power transmission without power loss. The opposing magnetic cone 36 is attached to the vertical shaft 5 to transmit the power to the generator. Typical radial bearings 39 are provided and a lateral thrust bearing 33 is provided. The radial bearings 39 will provide alignment of the magnetic cone 36. The lateral thrust bearing 33 accepts the vertical shaft 5, vertical weight and loading. Hence there are three radial bearings 39 and one lateral thrust bearing 33 employed with the 90° Translating Unit 2. The blades 1 are connected via the blade mounting hub 40. One set of blades is fitted with upwind blades; the opposite blades are designed as downwind blades. Hence, the wind is introduced into the upwind blades first and flows through the downwind blades, thereby causing opposite rotation of the blades 1. The blades are designed to be pitched to allow the total force to be additive, yet counter-rotating.

The connection component enclosure 10 is a radial yawing bearing. The bearing allows the 90° Translating System 2 to be joined to the dampener 3. The vertical shaft 5 is rotating at all times when wind is blowing. The rotation of the shaft provides power for the yaw unit to operate. The radial yaw bearing connection 10 is attached to the tower 4 via the dampener 3. A control sensory unit determines the ideal direction in which the turbine unit should be headed.

When the wind directional control unit senses a need to change direction, the upper section bearing is unlocked. Hydraulic cylinders 32 grip the main vertical shaft 5 allowing the 90° Translating Unit 2 to move, thereby positioning the 90° Translating unit 2 to its new direction. Once the direction is established, the cylinders 32 are released and the bearing is locked in place. The tower legs extend into the dampener assembly and are structurally attached.

Figure 9:
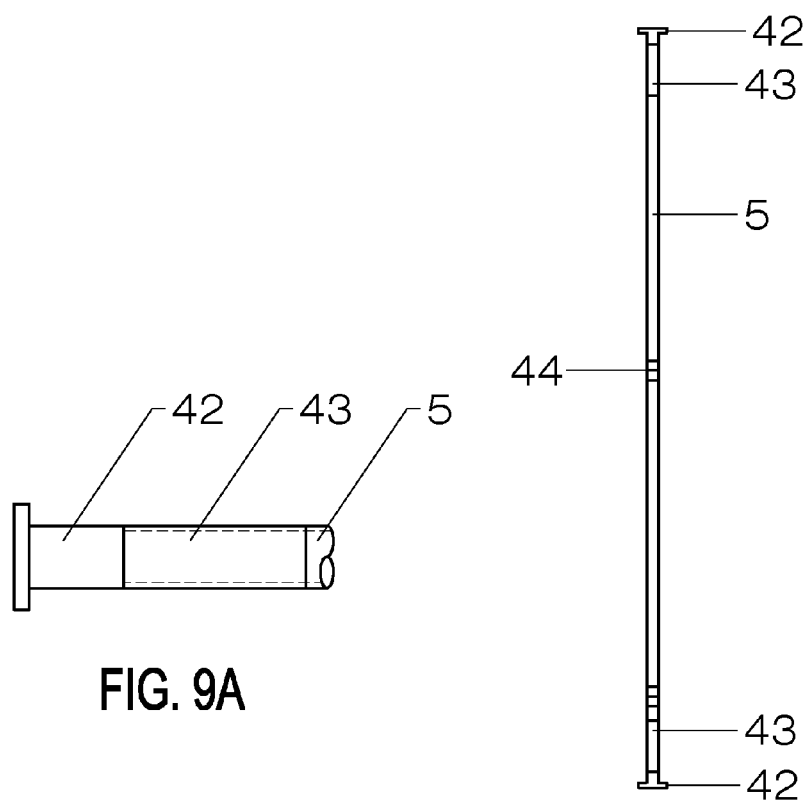
FIG. 9 illustrates the vertical power transmission shaft and end connections detail.

FIG. 9 illustrates the vertical power shaft 5. The end tubes 43 of the power shaft 5 are made of a carbon fiber material. The end connections 42 and middle joints 44 are constructed of steel material attached to the carbon fiber tube 43 which is a greater wall thickness that the power shaft 5. The vertical power shaft 5 is fitted with several lengths to accommodate the complete power shaft 5. The lower end of the power shaft 5 is fitted with a spline/magnetic speed adjustment coupling 18. FIG. 9A illustrates the steel coupling connections 42 and the carbon fiber shaft 43.

Figure 10:
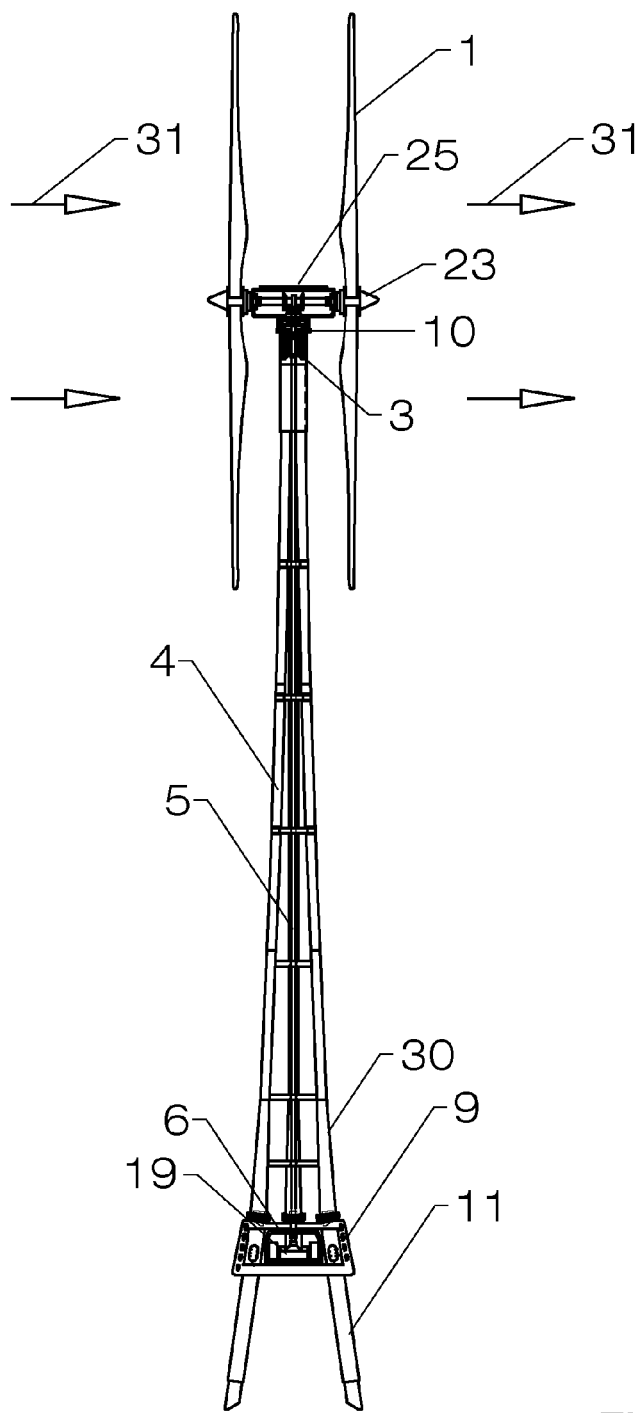
FIG. 10 illustrates the blade arrangement and basic spacing of blade units.

FIG. 10 illustrates a frontal view of the invention. Once the wind direction 31 is determined and the 90° Translating Unit 2 is locked in place, the wind velocities are introduced to the upwind blades first and then travel to the downwind blades. The pitch of each blade 1 is in a mode to provide rotation of the horizontal main shaft 35. The magnetic center core unit 36 rotates the power shaft 5, thereby rotating the generator 19 located at the base of the tower.

The generator 19 is mounted to the foundation of the transition section 9. The speed of the generator allows the production of electrical power. The power is then transferred into suitable power quality for transmission. Due to the wind velocities, the power shaft 5 is rotated within a variable speed. The magnetic couplings 18 provide speed adjustment, which at all times provides a constant speed input into the generator 19. The simple system provides a method, which allows the production of power at a high-efficient level.

Figure 11:
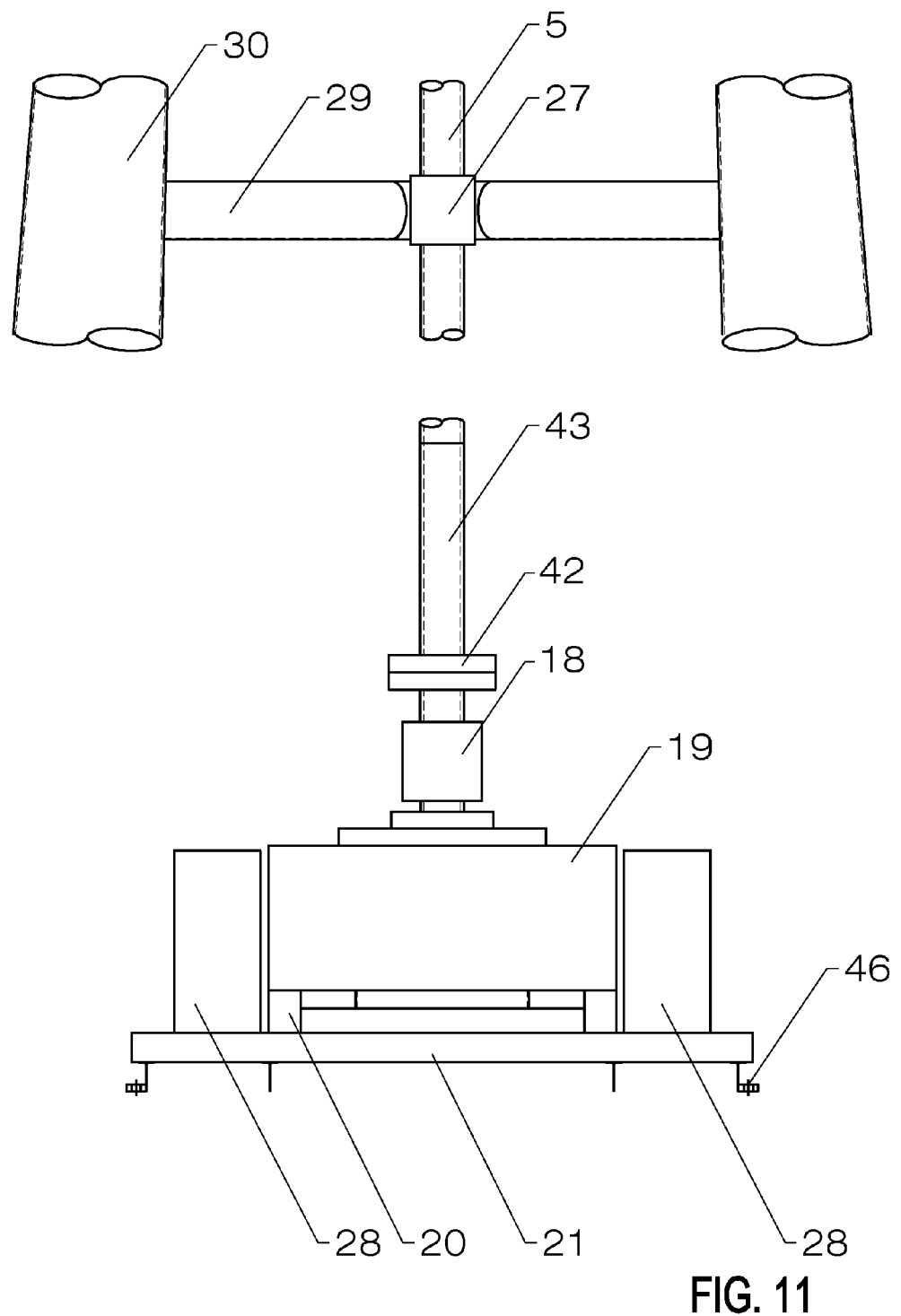
FIG. 11 illustrates the lateral support member that connects the three-tube member, the torsional tube bushing supports and the vertical tubular leg units.

FIG. 11 illustrates a drawing of the magnetic speed adjustment unit 18. The magnetic pads are physically adjusted to provide a constant speed having a variable input speed. The speed adjustment is activated at all times and the output speed is constant.

Figure 12:
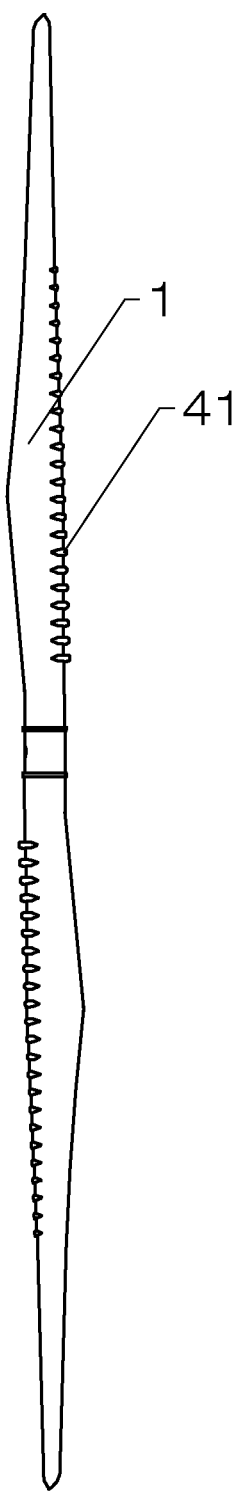
FIG. 12 illustrates the mounting of the blade tubercles and attachment area.

FIG. 11 also shows the generator 19 and transformer & controls 28. The skid rail 20 is a mechanical structure, which provides proper alignment. The skid arrangement is fastened to the main structure by a bolted arrangement 46. This assembly is designed as a major component and can be transported in one assembly. Hence, for initial installation and replacement, the assembly can be changed in a matter of hours. The transformer and controls 28 are connected via buss bar arrangement. A very efficient and cost effective electrical system is realized FIG. 12 illustrates blades 1 which are equipped with improvements. The blades are equipped with tubercles 41 mounted onto the leading edge of the blades. The blade center section is attached to the blade mounting hub 40. The blade mounting hub 40 is equipped with a pitch adjustment unit. The singular adjustment unit will pitch both ends of the blades during one event. The leading edge of the blades is outfitted with tubercles 41. The tubercle 41 changes the normal flow of the wind stream to allow the blades to be adjusted at a more aggressive angle before reaching a stalling level is encountered. The blades are balanced to provide less vibration which can lead to fatigue or cracking of the blades. The blades are constructed of fiberglass and carbon fiber employing standard industry specifications.

Figure 13:
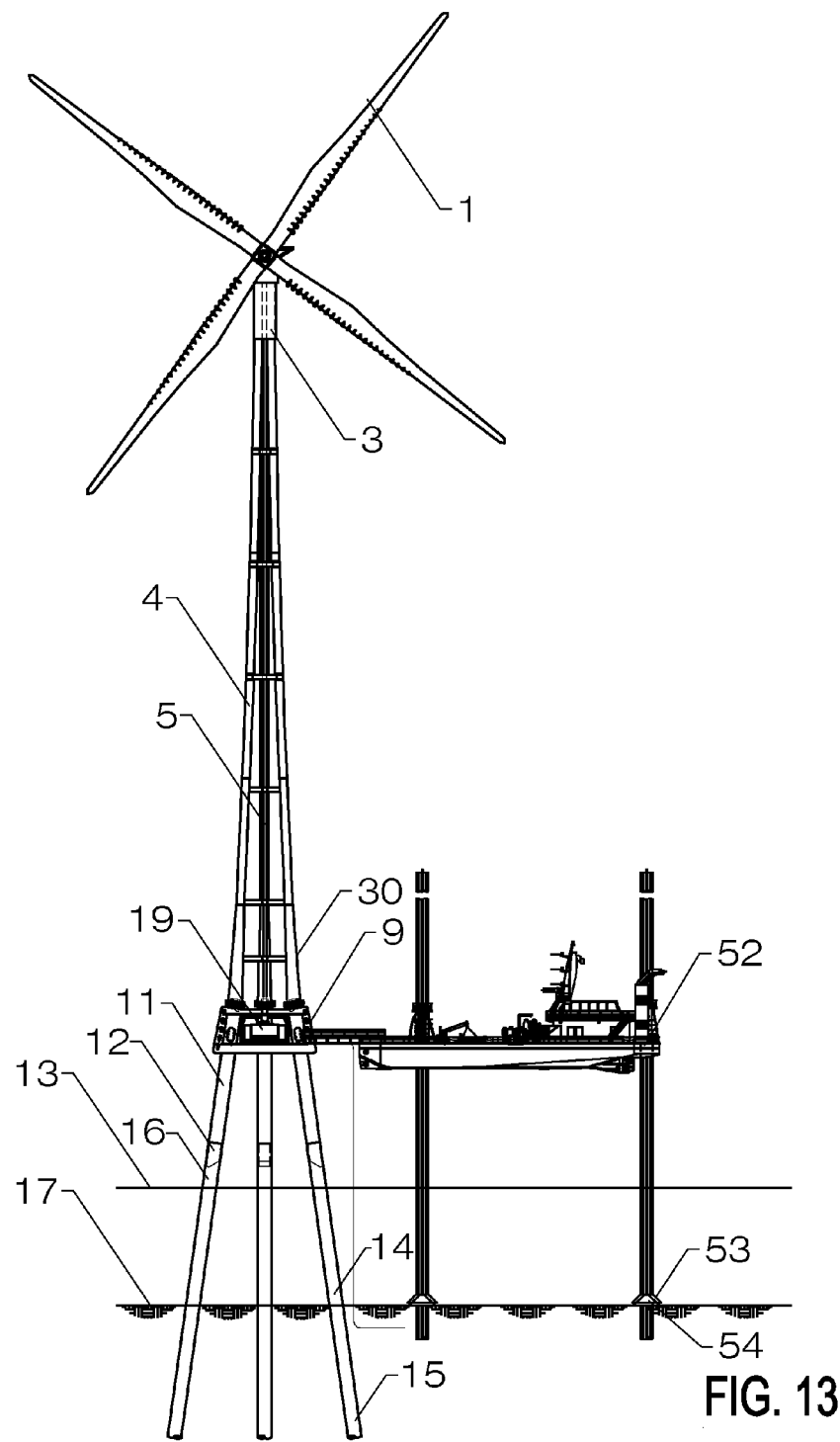
FIG. 13 illustrates the maintenance barge and means of boarding.

During offshore operations, boarding of the wind tower in harsh weather is required. FIG. 13 illustrates the offshore tower and turbine assembly in a maintenance mode. The boarding vessel 52 employs a modified liftboat. The liftboat boarding vessel 52 is constructed of aluminum and has steel legs. The weight of the boarding vessel 52 has been reduced to allow the vessel to be mounted onto the driven support pilings 54.

The driven piles 54 are capped with a concave cap. Three or more pilings are employed. The cap is located at the mud line. The location of the piles is identical to the liftboat leg locations. The steel legs are fitted with concave pads 53 that are fitted to the convex caps of the piling 54. The capped piles 54 are driven in a location of the lee side of the platform. The prevailing wind direction 31 is employed to determine the placement of the platform and supporting piles 54. Once the vessel is aligned with the support piles 54, the capped legs 53 will make contact and the vessel can be elevated above the sea action. It is not necessary that the liftboat employ a preloading procedure thereby allowing the vessel to enter the scope of work. Once the liftboat is elevated to the equipment deck of the platform, a work ramp is extended providing a means to board the vessel. Due to the invention, the major equipment can be maintained and replaced in a proper, safe manner.

Figure 14:
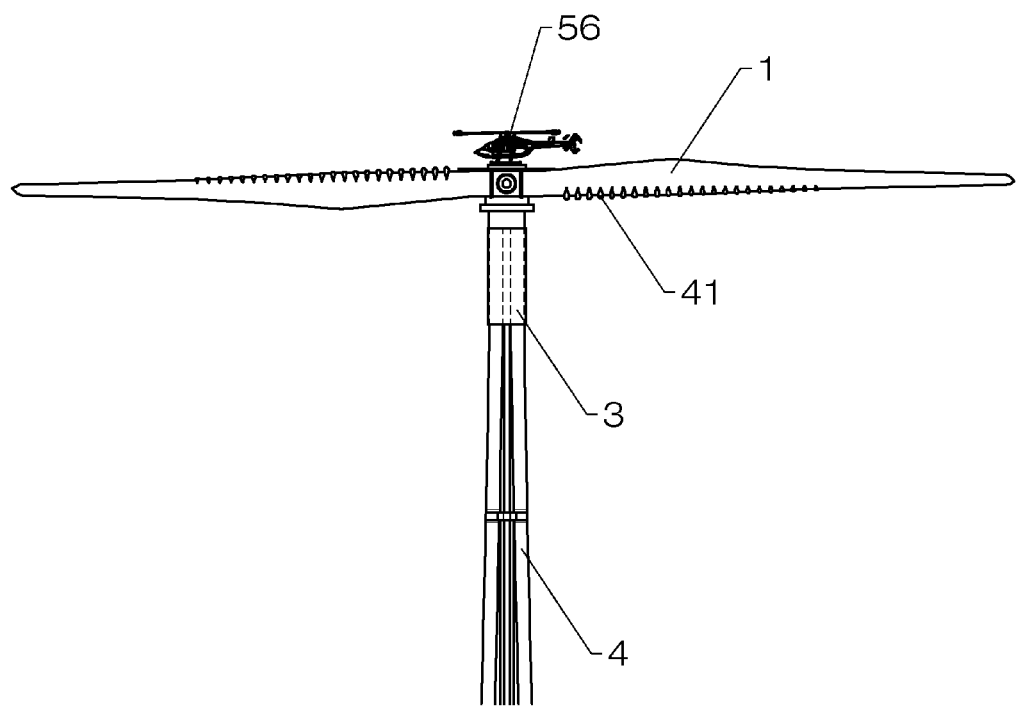
FIG. 14 illustrates the blade assembly in a horizontal blade mode providing aircraft operations.

FIG. 14 illustrates a frontal view of the invention. In the event of the boarding of the vessel via the marine vessel is not possible, a helicopter 56 can be employed. The design of the double, counter-rotating blades 1 can be positioned in a horizontal mode. When the blades are horizontal, the heliport 25 can be used. A four-passenger helicopter 56 can land and operate by use of the heliport 25. Once aboard, the personnel can enter the tower for maintenance or repair service. Inspection of blades 1 can be provided employing industry standard means.

The invention described in the patent application can be constructed in several platforms as a wind farm. The wind power platforms can produce power, which is gathered and transferred to the shoreline.

Figure 15:
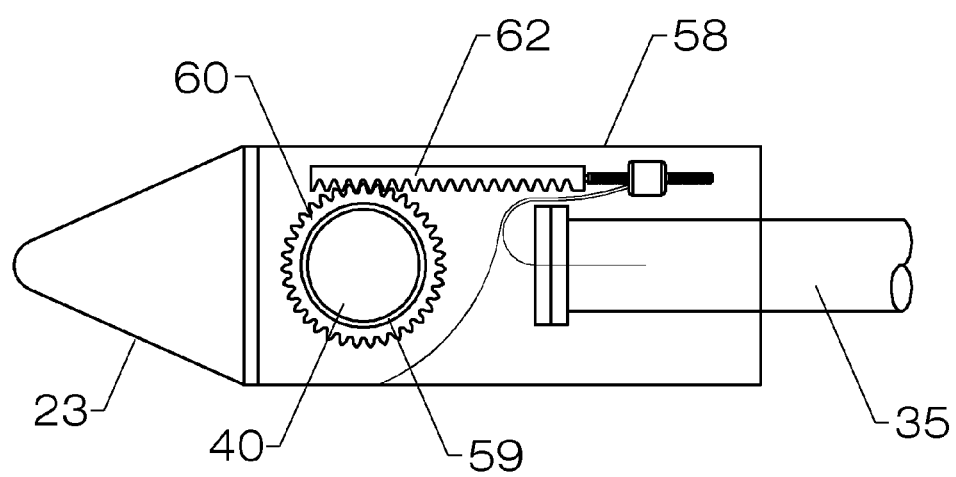
FIG. 15 illustrates the blade pitch control system.

FIG. 15 illustrates a blade pitch control system 58. The system is mounted onto both sets of blades, i.e. upwind and downwind. The blade unit is mounted onto bearings 59. The bearings 59 allow rotation of the blade unit 1. A radial gear 60 is attached to the blade mounting hub 40. The radial gear 60 is rotated by a powered rack 62 which is controlled by the onboard computer. Hence, pitch control is provided by an electrical impulse which in turn adjusts the blade's pitch.

Figure 16:
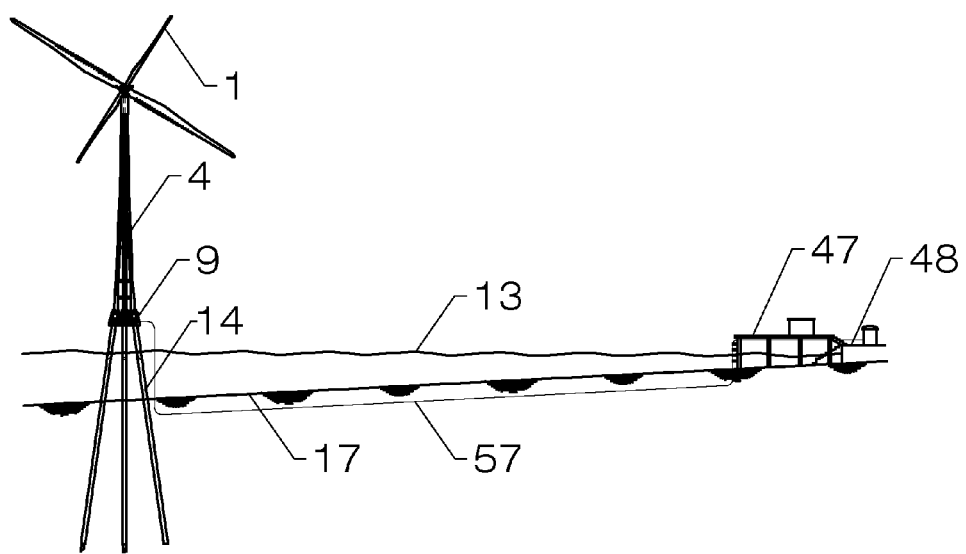
FIG. 16 illustrates a typical offshore wind unit arrangement and power line to the shoreline.

FIG. 16 illustrates a typical power gathering system from the offshore platform to the shoreline, the ocean surface 13 and the ocean bottom 17. The power cable 57 is placed underground of the ocean bottom 17. The cable enters the ocean bottom 17 via a J-tube unit, which is mounted in the internal diameter of the caisson.

The entrance area of the power cable to the onshore facility 48 must conform to environmental guidelines. The two main methods allow the cable to enter the shoreline via a horizontal drilled borehole or to enter via a shoreline structure 47 such as a pier. Either system can be employed and meets the codes of the various agencies. The onshore facility 48 connects the power to the grid.

Figure 17:
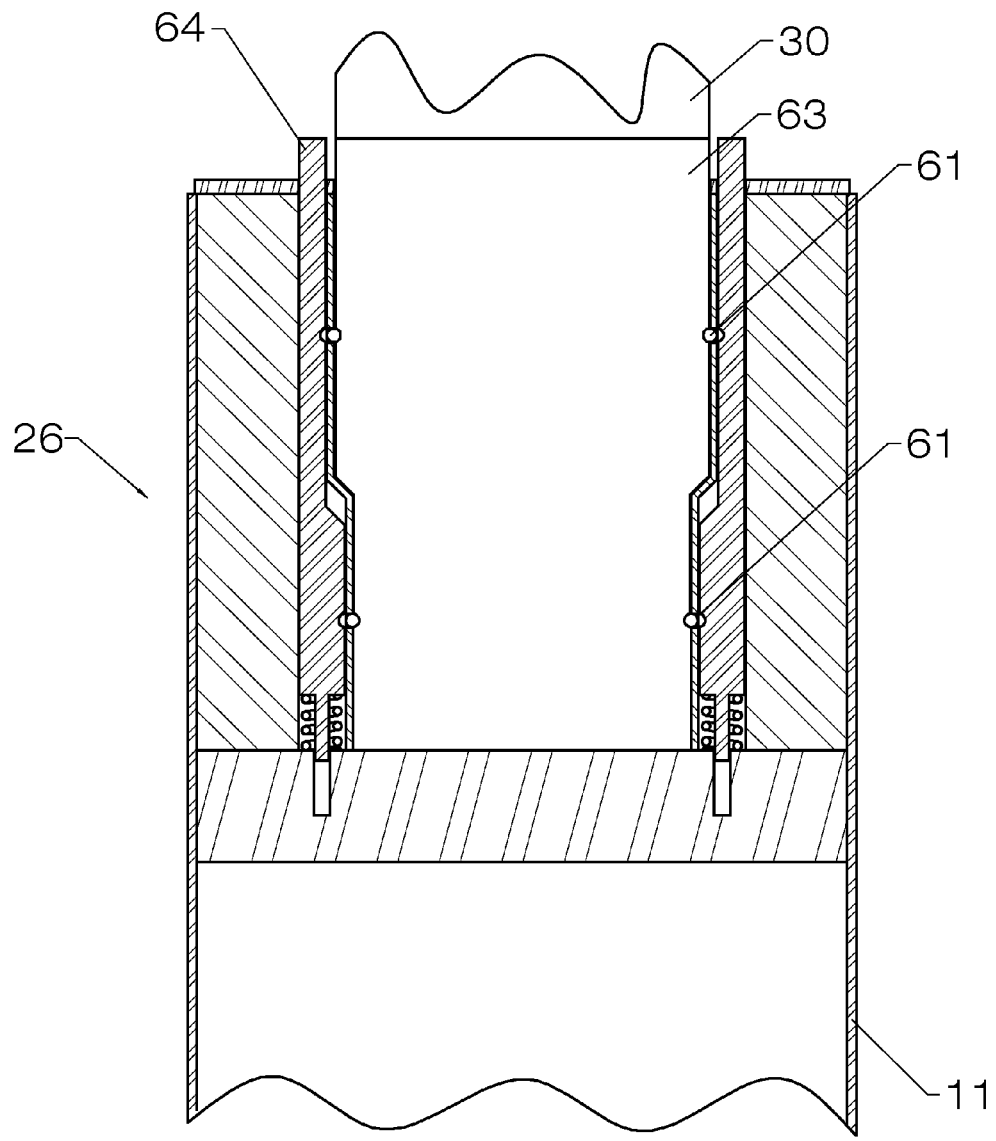
FIG. 17 illustrates the ball grab device employed to connect the tower to the transition section in an offshore operation.

FIG. 17 illustrates a ball grab unit 26. The system allows tubular members to be joined in one event. Special balls 61 are placed in a row. The row allows the balls to be recessed allowing passage of the male mounting member 63. Once the male component is seated into the female section 64; the balls are locked thereby providing a structural join which has greater structural strength than the leg section 30. The ball grab 26 can be disabled by use of a special tool.

A major capital cost is realized in the installation process of a wind unit or wind farm. Offshore construction equipment is 400% more expensive than onshore construction equipment; hence care must be taken in the offshore installation program.

Figure 18:
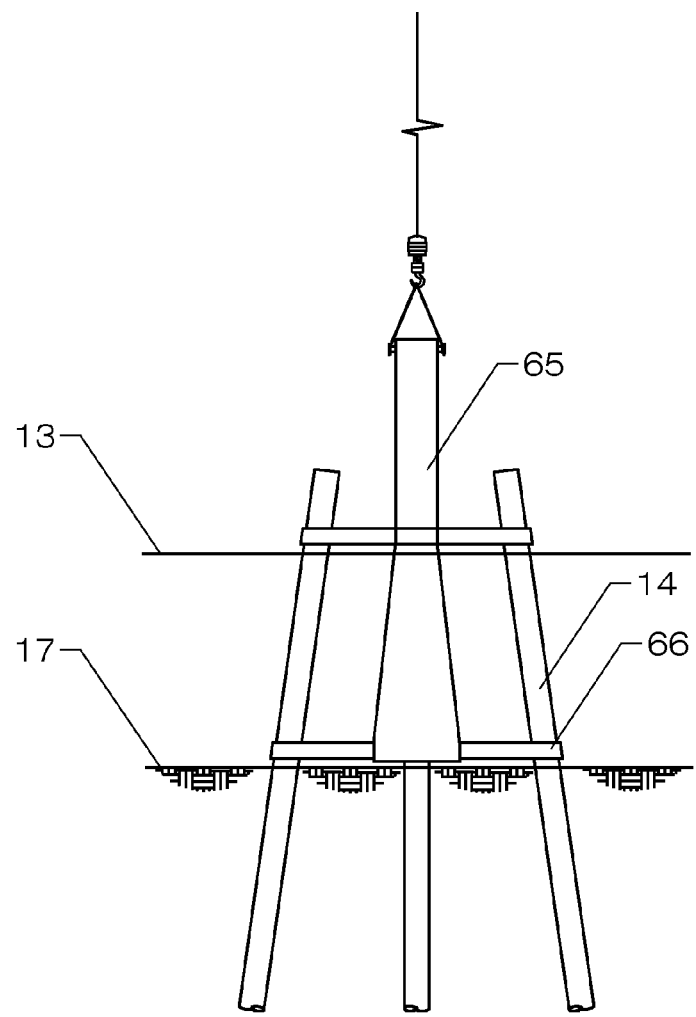
FIG. 18 illustrates the guide for inserting the caisson piles for offshore assembly. This is the beginning of the sequence regarding the invention.
Figure 18A:
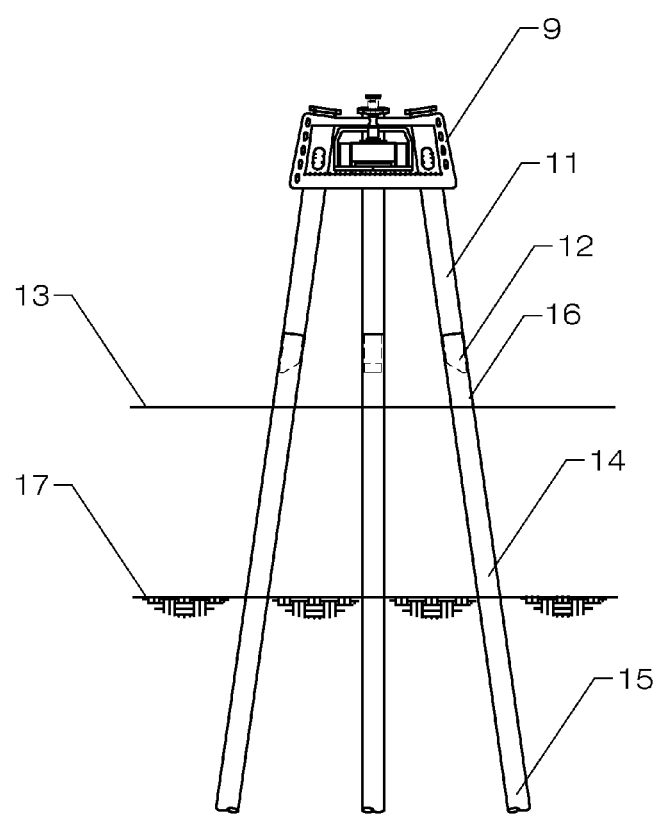
FIG. 18A illustrates the caisson installation sequence and connection to the tubular members and connection of the transition section.
Figure 18B:
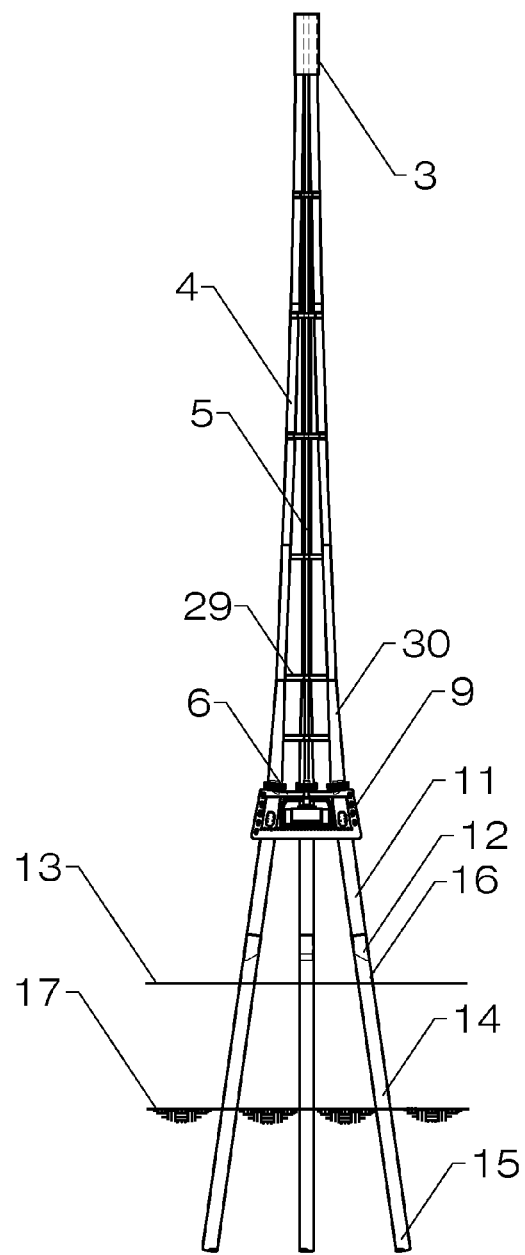
FIG. 18B illustrates the three tube tower installation to the transition section.
Figure 18C:
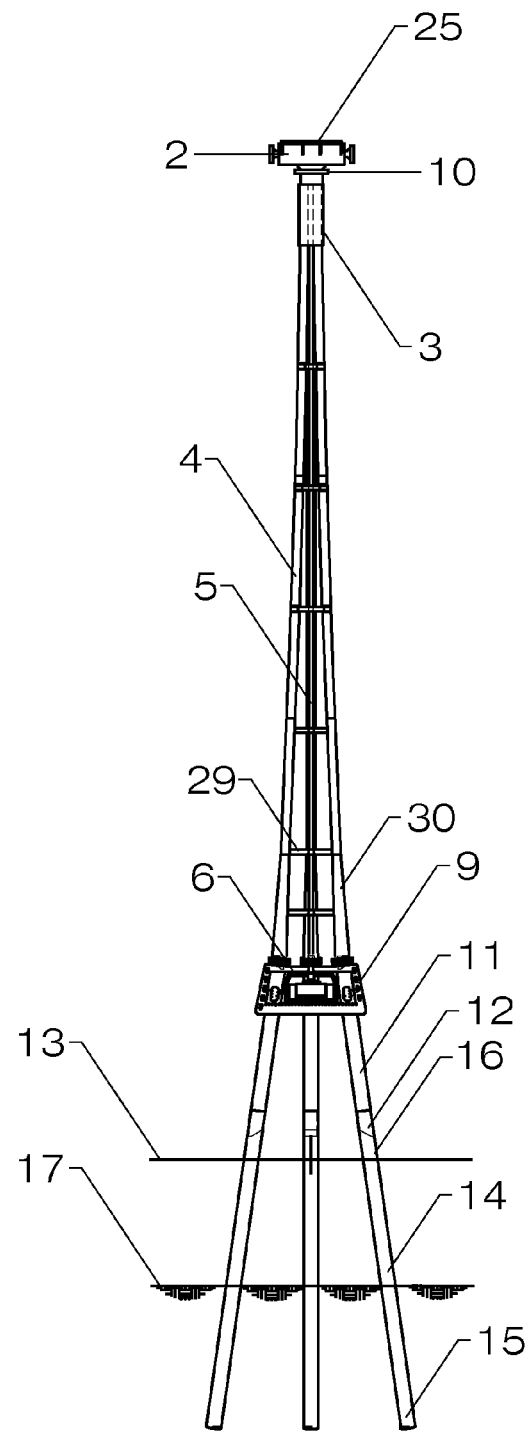
FIG. 18C illustrates the installation of the 90 degree translating unit onto the three tube tower.
Figure 18D:
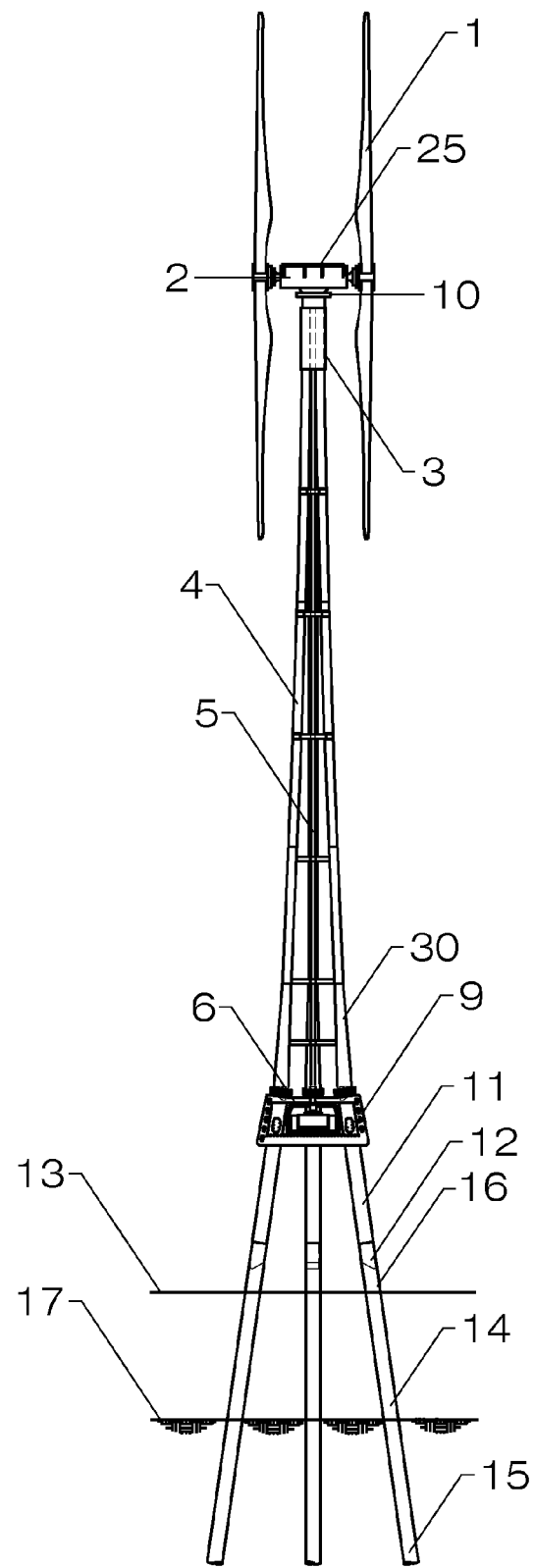
FIG. 18D illustrates the installation of the double counter rotating blades to the 90 degree translating unit.

FIGS. 18, 18-A, 18-B, 18-C and 18-D illustrate the installation procedure being employed via this invention. This invention allows for installation were as a minimum of time is expended offshore and the majority of the sub-assembled components are concluded onshore.

FIG. 18 illustrates a profile of the caissons 14 being installed employing the reusable portable template 65. The sea level 13 and ocean bottom 17 define the water depth. Caisson guides 66 set the batter (angle) of the caissons.

FIG. 18-A illustrates the mounting of the transition section 9 to the caisson 14 at the joint location 12. The joint locate 12 is welded in one event employing a narrow gap welding system FIG. 18-B illustrates the mounting of the tower 4 to the transition section 9 via the ball grab units 26. This procedure completes the installation of the caisson platform 14, transition 9, and tower 4 complete with the vibration dampener 3.

FIG. 18-C illustrates the wind system structure with the 90° Translating Unit 2 installed and ready for the acceptance of the double, counter-rotating blades 1.

FIG. 18-D illustrates the complete wind system and blades 1 mounted to the 90° Translating unit 2.

Figure 19:
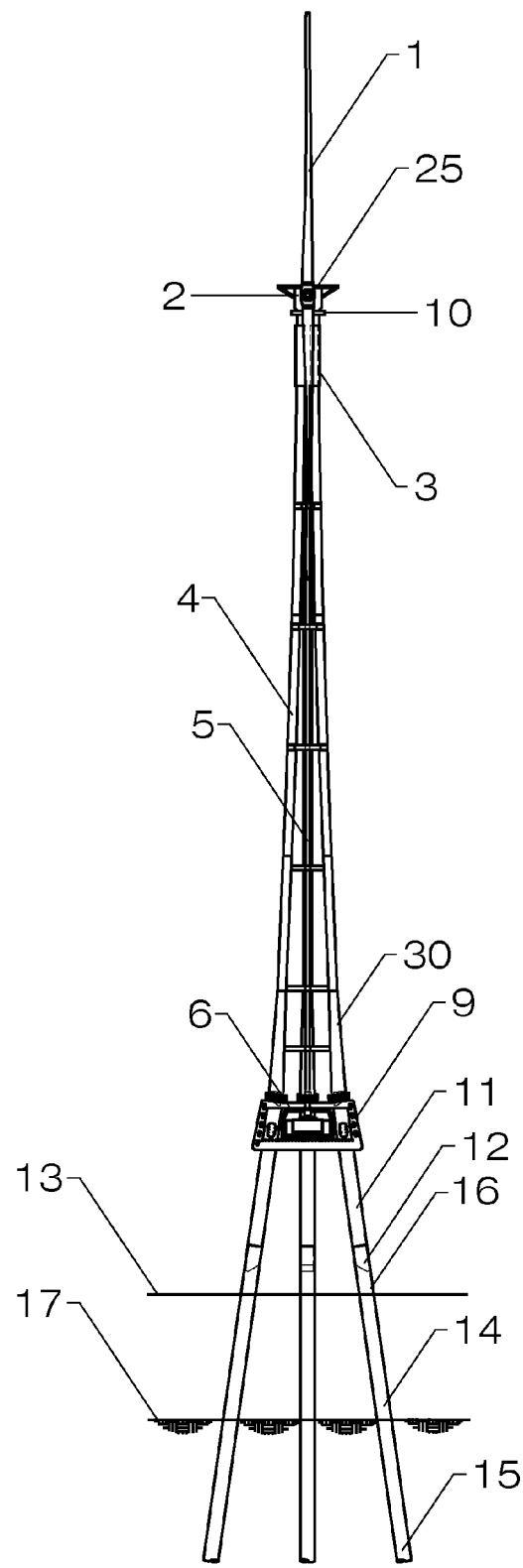
FIG. 19 illustrates the offshore wind system configured in a storm mode.

Offshore wind systems can be subjected to storms which can have wind velocities up to 200 mph. The structures and blades used in this invention are designed to accept the 200 mph wind loadings. The novel design of the blade arrangement allows the wind translating unit to be placed in position to allow a minimum exposure of the blades into the storm winds. FIG. 19 illustrates the wind unit placed in a storm mode. The blades 1 are placed in a vertical location. All the blades are pitched to provide a minimum of exposed surface area. By this method, storm winds will only be exposed to the surfaces as seen in FIG. 19.

The total weight of this invention compared to other industry systems being employed in offshore wind farms is greatly reduced. The weight overall is much lower than the typical industry wind units. Of greater importance and noteworthiness, the top of the tower in this invention is much lower than conventional industry standard units.

FIG. 20 is a chart which illustrates the cost comparison of the invention to standard wind farms. As illustrated, the installation cost is much less employing the invention, thereby reducing the overall capital cost.

INVENTION QUALITIES

Summary

The economic development of electrical power generated from offshore wind power required certain conditions to be balanced. The balance of the system and equipment is listed in this summary.

The invention employs double/counter-rotating blades, which in combination reaches the BEST power coefficient.

The invention employs a method to translate the direction of power from a horizontal mode to a vertical mode without power losses in the transition process.

The invention provides for the transmission of forces from the upper mounted translating system downward to the location of the generator located at base level via a light weight, low maintenance power shaft.

The wind blades are employed to provide more efficient transformation of wind energy with rotating power. The tubercles adjust the flow of wind in a fashion to provide more efficiency to the blade pitch.

To provide a magnetic speed adjustment unit, this allows variable speed from the blades to be adjusted on a constant basis to provide specific speed into the generator.

The invention provides the wind unit power train a method to reduce the force of shock loading. This magnetic system allows for slippage where high, short-term excessive loading is present.

To provide a lightweight tower with provided access to the top of the tower and a substantial reduction of weight resulting in the cost of the tower to be greatly reduced.

To provide a caisson platform, mounted with an internal J-tube and connection to the transition section. The use of special narrow-gap welding groove and a novel welding machine is part of the installation process of this invention.

The invention provides ball grabs to reduce offshore installation. The use of ball grab units reduces installation time from days to minutes greatly reducing cost.

The installation of the invention is very efficient due to the lightweight components and ease of assembly.

The invention provides a method in which the platform can be boarded by aircraft or from a marine vessel. Component replacement is very efficient.

The invention can provide a weight efficient system, which has a substantial cost reduction of construction, installation and maintenance. The balance of equipment, methods and useful life has been addressed to provide an offshore wind system, which can be economic, compared to conventional methods of offshore electrical power production.

What is claimed is:

1. An offshore wind translating system comprising:
   an undersea tubular structure having a plurality of caissons, the caissons are not laterally connected, and each of a lower portion of the caissons is driven in an ocean bottom;
   a platform located above an ocean surface and having a transition unit, the transition unit coupled to each of an upper portion of the caissons;
   an electrical generator mounted on the platform;
   a three-tube tower having a lower end and an upper end, the lower end coupled to the transition unit;
   a dampener connected to the upper end of the three-tube tower;
   a 90 degree torque connecting device supported by the dampener;
   a double, counter-rotating blade system having a pair of blade assemblies for converting kinetic energy of wind into rotational energy; each one of the blade assemblies being coupled to the respective opposite ends of the 90 degree torque connecting device, wherein the first one of the pair of the blade assemblies being adapted for rotating in a first direction, and the second one of the pair of the blade assemblies being adapted for rotating in a second direction opposite of the first direction, wherein a producing torque from each one of the blade assemblies in a horizontal manner entering the 90 degree torque connecting device which allows the torque to be translated vertically down to the platform-mounted electrical generator.

2. The offshore wind translating system of claim 1, wherein the caissons are the major support in installation into the ocean by use of a caisson guide which is reusable.

3. The offshore wind translating system of claim 1, wherein each upper portion of the caisson is welded to the transition unit by a narrow gap welding system.

4. The offshore wind translating system of claim 1, wherein the blade assemblies are fitted with leading edge tubercles which allow the angle of pitch to be increased at a much greater angle than standard wind turbine blades.

5. The offshore wind translating system of claim 1, wherein further comprises a means to translate the flow of torsion generated by the rotating blades employ a magnetic power transmission system employing a small cone unit mounted adjacent to a larger cone assembly thereby transmitting the power without any contact with relation to the small or large cone units.

6. The offshore wind translating system of claim 1, wherein the plurality of caissons comprises three steel caissons driven at an 8 degree batter.

7. The offshore wind translating system of claim 6, wherein the three caissons which are not connected below the sea level thereby providing minimum drag on the platform.

8. The offshore wind translating system of claim 1, wherein the three-tube tower which provides a means to place the offshore wind translating system to a desired height above the ocean surface.

9. The offshore wind translating system of claim 8, wherein the three-tube tower is constructed of three independent tubes and joined laterally whereas the three tubes function as one assembly.

10. The offshore wind translating system of claim 8, wherein the three-tube tower are fitted with special means of attachment to the platform via grab ball assembly devices.

11. The offshore wind translating system of claim 8, wherein the three-tubes are fitted with special means of attachment to the platform via grab ball assembly devices.

12. The offshore wind translating system of claim 1, wherein the first one of the pair of the blade assemblies designed for approaching wind and the second one of the pair of the blade assemblies designed for exit wind which allow the efficiency of the blades to reach the BEST factor.

13. The offshore wind translating system of claim 12, further comprises a horizontal power shaft mounted onto radial bearings and connected to the pair of the blade assemblies at each end extremity thereof, wherein the first one of the pair of the blade assemblies is connected directly to the horizontal power shaft and the second one of the pair of the blade assemblies is connected to the horizontal power shaft via an overriding clutch.

14. The offshore wind translating system of claim 13, wherein the overriding clutch allows power adjustments considering a total power output of the approaching wind and exit wind blade assemblies.

15. The offshore wind translating system of claim 13, wherein the overriding clutch employs the horizontal power shaft to have a constant flow of torque which is to be transmitted to the platform-mounted electrical generator.

* * * * *